US012602388B2

(12) United States Patent
Gadit et al.

(10) Patent No.: US 12,602,388 B2
(45) Date of Patent: Apr. 14, 2026

(54) GENERATIVE SEARCH ENGINE TEXT DOCUMENTS

(71) Applicant: Microsoft Technology Licensing, LLC, Redmond, WA (US)

(72) Inventors: Mohamed Salman Ismail Gadit, San Jose, CA (US); Shivani Sridhar, San Jose, CA (US); Beverly Roberta Shen, San Jose, CA (US); Yu-An Lin, San Francisco, CA (US); Ronak Digant Upadhyaya, Seattle, WA (US); Sriram Selvam, Lynnwood, WA (US); Avishek Dan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/643,806

(22) Filed: Apr. 23, 2024

(65) Prior Publication Data

US 2025/0328536 A1 Oct. 23, 2025

(51) Int. Cl.
*G06F 16/2457* (2019.01)
*G06F 16/215* (2019.01)
*G06F 16/9538* (2019.01)

(52) U.S. Cl.
CPC ...... *G06F 16/24578* (2019.01); *G06F 16/215* (2019.01); *G06F 16/9538* (2019.01)

(58) Field of Classification Search
None
See application file for complete search history.

(56) References Cited

U.S. PATENT DOCUMENTS

| | | | | |
|---|---|---|---|---|
| 8,762,360 | B2 * | 6/2014 | Jiang | G06F 16/9538 |
| | | | | 706/14 |
| 9,965,492 | B1 * | 5/2018 | Wang | G01C 21/3617 |
| 10,360,268 | B2 * | 7/2019 | DeLuca | G06F 16/3326 |
| 12,242,432 | B2 * | 3/2025 | Lutz | G06F 16/258 |
| 12,242,522 | B2 * | 3/2025 | Gardner | G06N 5/041 |

(Continued)

OTHER PUBLICATIONS

A Neural Probabilistic Model for Context Based Citation Recommendation (Year: 2015).*

(Continued)

*Primary Examiner* — Kim T Nguyen
(74) *Attorney, Agent, or Firm* — Ray Quinney & Nebeker P.C.; Christopher K. Hallstrom

(57) ABSTRACT

This disclosure describes utilizing a generative document system to dynamically build and provide generative text documents using one or more generative artificial intelligence (AI) models. For example, the generative document system efficiently utilizes various systems and one or more generative AI models to determine intents and topics, curate topic sections, and generate a generative text document that includes a directed answer along with select curated topic sections for search queries. In various implementations, the generative document system performs additional actions that enhance the efficiency and accuracy of operations used to produce generative text documents. Additionally, in many cases, these generative text documents provide a foundation for providing an interactive, intuitive, wide-ranging, and flexible curation of answers to users that address the corresponding search queries.

20 Claims, 10 Drawing Sheets

(56)     References Cited

U.S. PATENT DOCUMENTS

| | | | |
|---|---|---|---|
| 2012/0284247 A1* | 11/2012 | Jiang ................... | G06F 16/9538 |
| | | | 707/706 |
| 2015/0294220 A1* | 10/2015 | Oreif ................... | G06F 16/338 |
| | | | 715/835 |
| 2018/0052888 A1* | 2/2018 | DeLuca .............. | G06F 16/3349 |
| 2024/0362286 A1* | 10/2024 | He .......................... | G06F 16/93 |
| 2025/0028747 A1* | 1/2025 | Hagler ................ | G06N 3/0475 |
| 2025/0061307 A1* | 2/2025 | Tran ....................... | G06N 3/045 |
| 2025/0225539 A1* | 7/2025 | Cail ....................... | G06F 16/211 |
| 2025/0252192 A1* | 8/2025 | Blair .................... | G06F 40/279 |
| 2025/0293998 A1* | 9/2025 | Courcelle ............ | G06N 3/0895 |
| 2025/0328536 A1* | 10/2025 | Gadit ............... | G06F 16/24578 |
| 2025/0363028 A1* | 11/2025 | Sussman .............. | G06F 11/302 |

OTHER PUBLICATIONS

AI Meets AI: Leveraging Query Executions to Improve Index Recommendations (Year: 2019).*

* cited by examiner

100

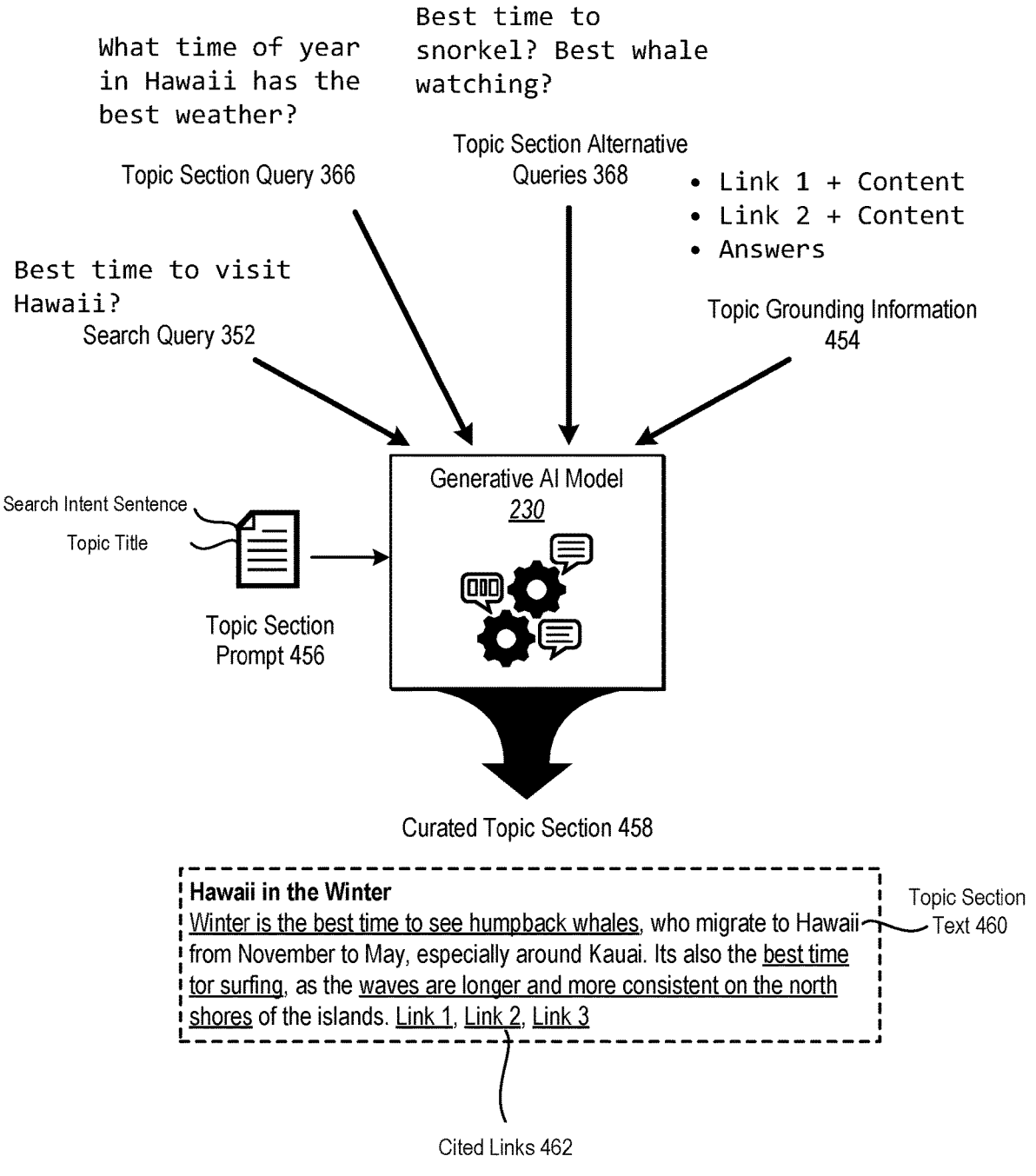

What time of year in Hawaii has the best weather?

Topic Section Query 366

Best time to snorkel? Best whale watching?

Topic Section Alternative Queries 368

- Link 1 + Content
- Link 2 + Content
- Answers

Topic Grounding Information 454

Best time to visit Hawaii?

Search Query 352

Search Intent Sentence

Topic Title

Topic Section Prompt 456

Generative AI Model
230

Curated Topic Section 458

Hawaii in the Winter
Winter is the best time to see humpback whales, who migrate to Hawaii from November to May, especially around Kauai. Its also the best time tor surfing, as the waves are longer and more consistent on the north shores of the islands. Link 1, Link 2, Link 3

Topic Section
Text 460

Cited Links 462

FIG. 4B

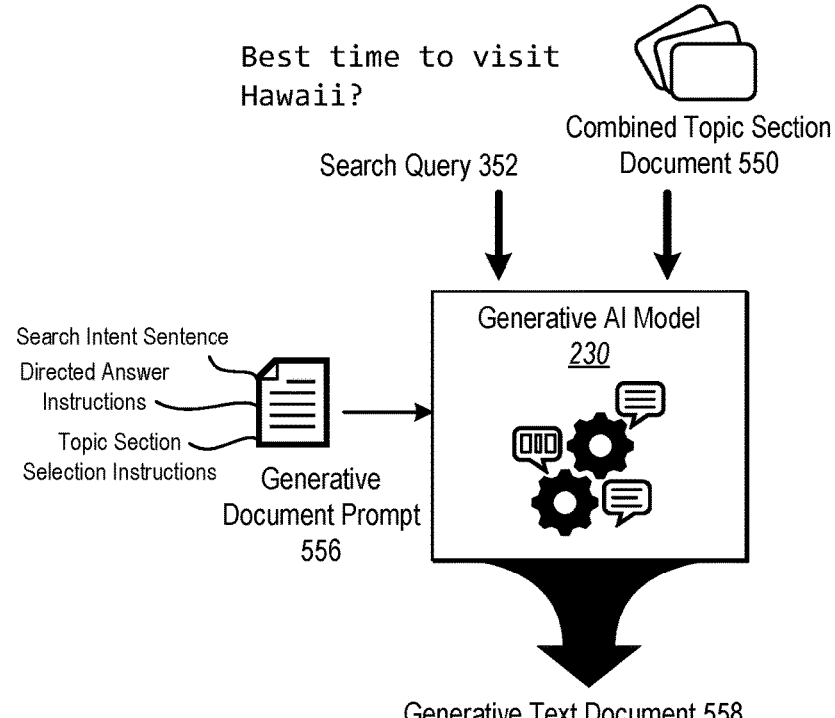

Best time to visit Hawaii?

Combined Topic Section Document 550

Search Query 352

Search Intent Sentence
Directed Answer Instructions
Topic Section Selection Instructions Generative Document Prompt 556

Generative AI Model 230

Generative Text Document 558

560 — Directed Answer:
The Best Time to Visit Hawaii
The best time to visit Hawaii is in the spring, especially in May, when the weather is pleasant, the rates are lower, and the crowds are fewer. The spring is also the start of the quote 'dry' quote season and a wonderful time to enjoy the produce and flowers.

562 — Selected Topic Sections:
The best time to visit Hawaii depends on your preferences, budget, and interests. Hawaii has a tropical climate with year-round warm temperatures, but there are variations in rainfall, surf conditions, whale sightings, and events across the islands and seasons.

Enjoy Perfect Weather?
If you want to enjoy perfect weather with low humidity and trade winds, avoid the peak tourist season of mid-December to mid-April and opt for late spring or early fall instead. These months also offer lower rates for accommodation and flights, as well as less crowded beaches and attractions. Link 1

Hawaii in the Winter
However, if you don't mind paying more and sharing the islands with other visitors, you can also find plenty of reasons to visit Hawaii in the winter or summer. Winter is the best time to see humpback whales, who migrate to Hawaii from November to May, especially around Maui and Kauai. It's also the best time for surfing, as the waves are bigger and more consistent on the north shores of all islands. Link 1, Link 2, Link 3

Hawaii in the Summer
Summer is ideal for families with kids, as there are many festivals and events to enjoy, such as the Prince Lot Hula Festival in Oahu, which showcases traditional Hawaiian dance and culture. Summer also has less rainfall and more sunshine than winter, making it perfect for outdoor activities like hiking, snorkeling, and kayaking. Link 4

Month by Month by Weather
No matter when you decide to visit Hawaii, you can expect to find stunning scenery, diverse landscapes, rich history, and a friendly aloha spirit. Here is a month-by-month guide to help you plan your trip according to the weather, rates, and events on each island. Link 1

FIG. 5B

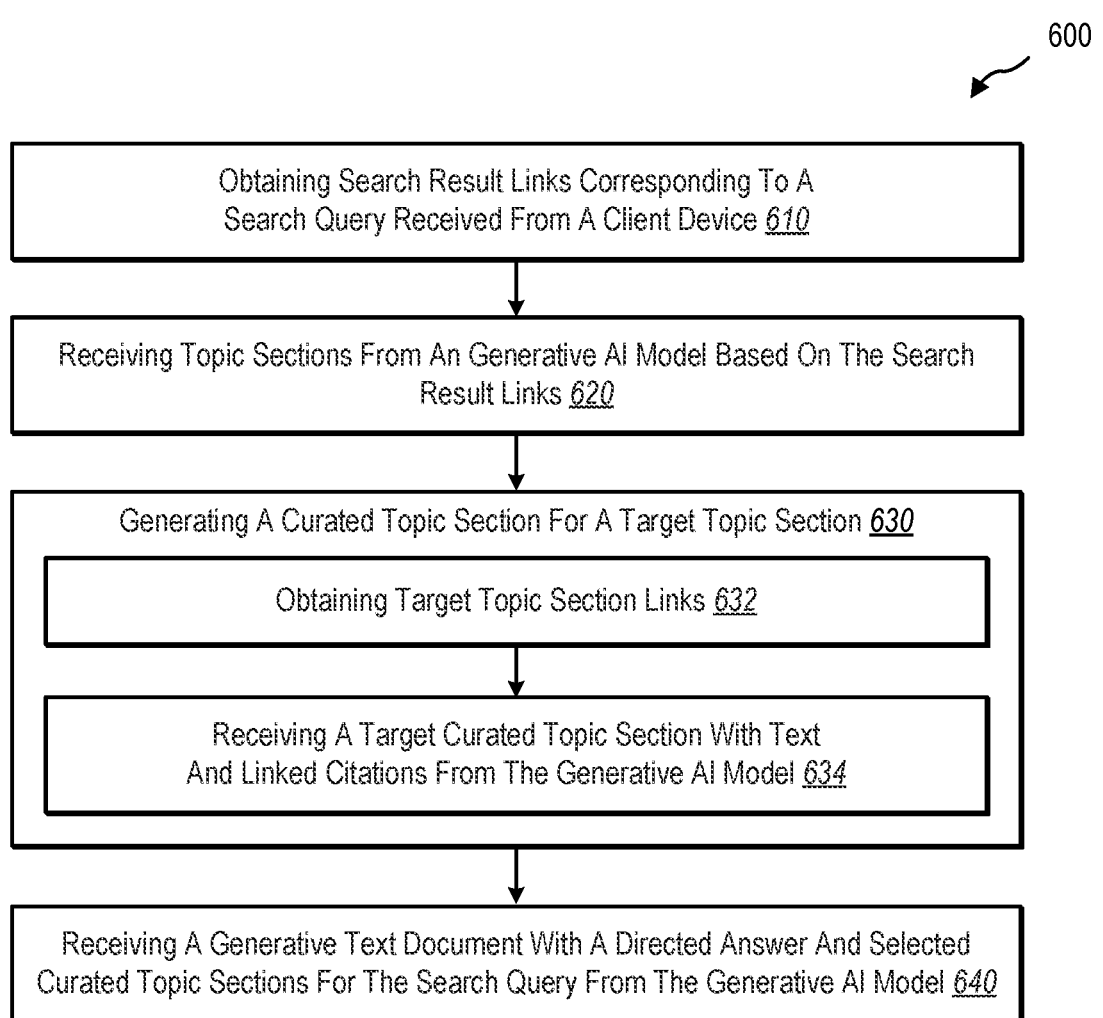

600

Obtaining Search Result Links Corresponding To A
Search Query Received From A Client Device _610_

Receiving Topic Sections From An Generative AI Model Based On The Search
Result Links _620_

Generating A Curated Topic Section For A Target Topic Section _630_

Obtaining Target Topic Section Links _632_

Receiving A Target Curated Topic Section With Text
And Linked Citations From The Generative AI Model _634_

Receiving A Generative Text Document With A Directed Answer And Selected
Curated Topic Sections For The Search Query From The Generative AI Model _640_

FIG. 6

GENERATIVE SEARCH ENGINE TEXT DOCUMENTS

CROSS-REFERENCE TO RELATED APPLICATIONS

The present application is related to U.S. patent application Ser. No. 18/537,788, entitled GENERATIVE SEARCH ENGINE RESULTS DOCUMENTS, filed on Dec. 12, 2023, which is incorporated herein by reference.

BACKGROUND

In recent years, there have been significant advancements in both hardware and software domains, specifically in the field of internet search. Current systems are designed to retrieve and present lists of links and resources in response to user search queries. These systems also offer direct answers for frequently searched topics. However, as the number of accessible resources continues to grow, existing systems have limitations in providing useful and relevant answers without requiring significant user effort. Furthermore, despite recent advancements and improvements, existing systems face technical challenges in providing prompt and accurate query responses due to the ever-growing amount of available information. These and other issues are present in current search result systems.

BRIEF DESCRIPTION OF THE DRAWINGS

The following detailed description provides specific and detailed implementations accompanied by drawings. Additionally, each of the figures listed below corresponds to one or more implementations discussed in this disclosure.

FIGS. 4A-4B illustrate example sequence and block diagrams of using a generative AI model to generate curated topic sections for the search query.

FIGS. 5A-5B illustrate example sequence and block diagrams of using a generative AI model to generate a generative text document for the search query.

FIG. 6 illustrates an example series of acts of a computer-implemented method for using one or more generative AI models to generate a generative text document.

DETAILED DESCRIPTION

Figure 1:
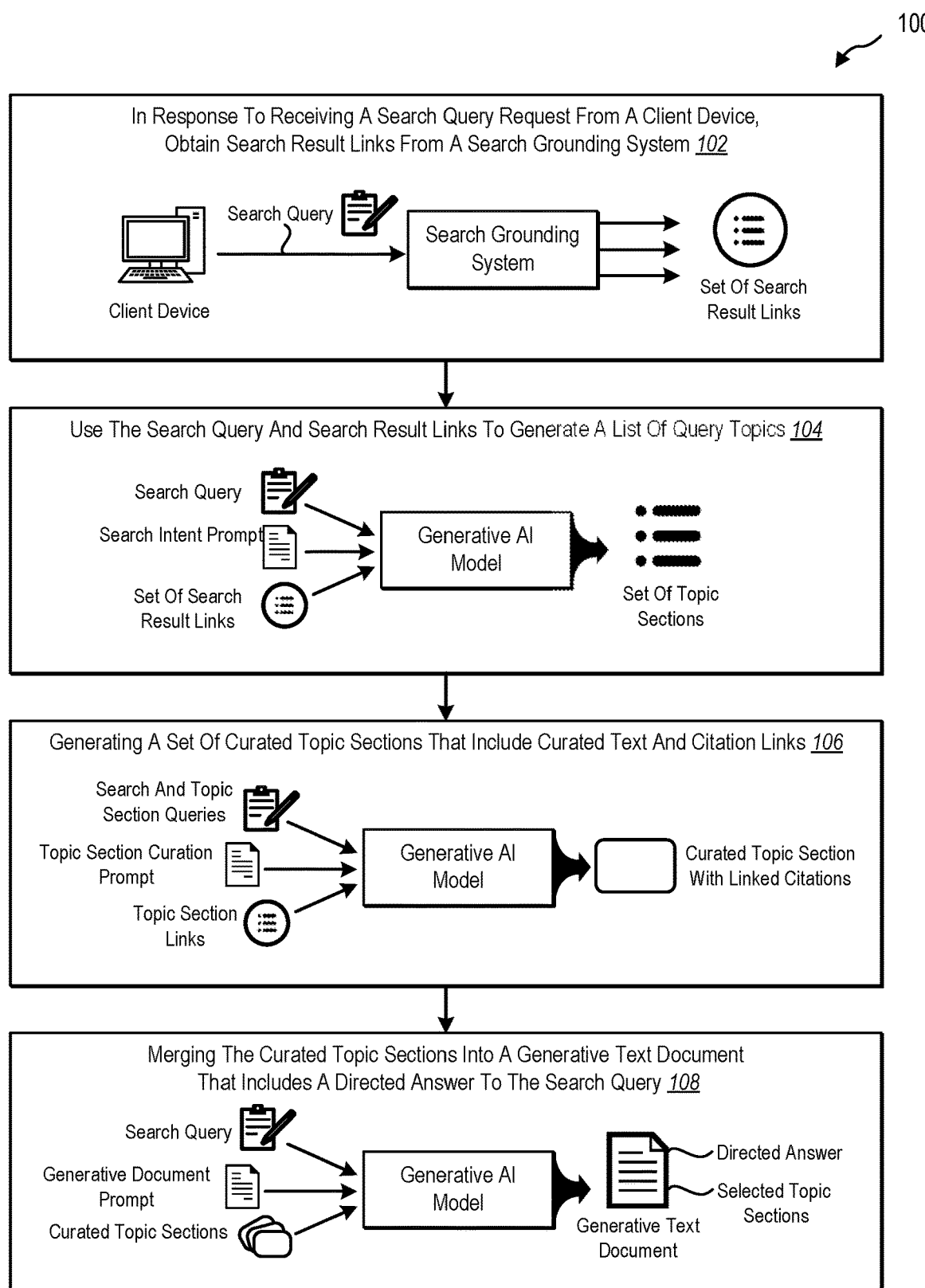
FIG. 1 illustrates an example overview of the generative document system using generative artificial intelligence (AI) models to create a generative text document for a search query.

This disclosure describes utilizing a generative document system to dynamically build and provide generative text documents using one or more generative artificial intelligence (AI) models. For example, the generative document system efficiently utilizes various systems and one or more generative AI models to determine intents and topics, curate topic sections, and generate a generative text document that includes a directed answer along with select curated topic sections for search queries. In various implementations, the generative document system performs additional actions that enhance the efficiency and accuracy of operations used to produce generative text documents. Additionally, in many cases, these generative text documents provide a foundation for providing an interactive, intuitive, wide-ranging, and flexible curation of answers to users that address the corresponding search queries.

Implementations of the present disclosure provide benefits and solve problems in the art with systems, computer-readable media, and computer-implemented methods that utilize the generative document system to curate and build generative text documents from search queries and search result links using one or more generative AI models. As described below, the generative document system utilizes one or more search systems and generative AI models to leverage different outputs to build a generative text document that includes a directed answer, generative text organized into curated topic sections, and linked citations. In various implementations, the generative text document is the foundation for generating a multimedia generative document, which provides an enhanced user interface for providing search result information in a streamlined and understandable format.

As mentioned above, the generative document system creates or generates one or more search result documents (e.g., text-based generative documents with little to no layout) using one or more generative AI models. To illustrate, in various implementations, in response to receiving a search query from a client device, the generative document system obtains a set of search result links from a search grounding system. Based on providing a search intent prompt and the set of search result links to a generative AI model, the generative document system receives a set of topic sections from the generative AI model based on the set of search result links. Then, for one or more of the topic sections, the generative document system obtains a set of topic section links from the search grounding system and uses the same or different generative AI model. Based on providing topic section prompts that include the topic sections, to generate and return curated topic sections with text and linked citations. Additionally, the generative document system uses the same or different generative AI model to receive, based on providing the first curated topic section and a second curated topic section with a generative document prompt to the generative AI model, a generative text document that includes a directed answer followed by one or more curated topic sections.

As described in this disclosure, the generative document system delivers several significant technical benefits in terms of improved accuracy, efficiency, and flexibility compared to existing search result systems. Moreover, the generative document system provides several practical applications that address problems related to providing search results in response to search queries.

To better understand the technical benefits of the generative document system, consider some existing search result systems. Some existing systems display responses in the form of a Search Engine Results Page (SERP) in response to a user's web search query. A SERP includes a list of results that are relevant to the search query. In their early stages, search result systems simply provided a series of hyperlinks correlated with the user's search terms in a SERP. More recent search result systems, in some situations, provide SERPs that also include responses to frequently queried subjects. Despite these advancements, current systems face technical challenges.

As mentioned earlier, the generative document system creates generative text documents that provide streamlined, dynamic, and comprehensible answers to search queries. In various implementations, generative text documents include accurate and efficient curations of search result links cited within the curated text. In some instances, these search result links are also provided alongside the generative text documents. In various implementations, the generative document system creates improved SERPs that include a generative text document and corresponding search result links.

By using generative AI models to build generative text documents from search result links for a search query, the generative document system improves the accuracy and efficiency of providing search results. For example, the generative document system uses generative AI models to generate textual narrative responses from the search result links within a curated generative text document that includes a directed answer, curated topics associated with the search query, and linked citations. In some instances, the generative document system uses the generative text document to match textual narrative responses with curated answer cards that provide additional relevant information in the form of targeted and interactive answers.

As mentioned above, the generative document system builds upon the outputs of multiple calls or prompts made to one or more generative AI models. In some instances, the generative document system calls upon multiple generative AI models with different prompts. In some implementations, the generative document system prompts the same generative AI model with different prompts to generate different outputs (e.g., raw topic sections, curated topic sections, and the curated generative text document). The generative document system efficiently leverages different features and functions of generative AI models to create outputs that can be compounded to improve accuracy at each stage and efficiently construct a highly dynamic, streamlined, and valuable generative text document in response to a search query.

In various implementations, the generative document system improves efficiency by reusing generative text documents for recurring search result lists. For example, a generative text document is created based on a set of search result links retrieved in response to a search query, which also improves accuracy by reducing hallucinations as the generated data is sourced and supported by the search result links. When the same or a similar search query is repeated, by the same or another user, and results in the same or a similar set of search result links, the generative document system can efficiently and accurately reuse the same generative text document without making multiple calls to one or more generative AI models. When the set of search results differs beyond a threshold amount, the generative document system can update the generative text document to ensure accurate results are provided in response to a search query.

In various implementations, the generative document system uses parallel calls to systems, such as a search grounding system, and to one or more generative AI models to increase the efficiency of generating the generative text document. In some implementations, the generative document system performs filtering, citation-based culling, and section deduplication to improve the efficiency and accuracy of the curated generative text documents.

The generative document system also provides flexibility over existing systems. As mentioned earlier, the generative document system leverages different features of one or more generative AI models to generate multiple output formats. As part of this flexibility, the generative document system uses generative AI model outputs from earlier steps as generative AI model inputs in later steps to skillfully create elements needed to build the final formatted generative text document. As another part of this flexibility, the generative document system can provide different prompts to the same generative AI model to generate different generative AI model output types to be provided to different generative AI models.

As illustrated in the preceding discussion, this disclosure uses a variety of terms to describe the features and advantages of one or more described implementations. For instance, this disclosure describes the generative document system within the context of a cloud computing system.

As an example, an "artificial intelligence model" (generative AI model) is a large or small artificial intelligence system that utilizes deep learning and a large number of parameters (e.g., in the billions or trillions for a large version and fewer for a small version) that are trained on one or more extensive datasets to produce coherent, contextually relevant, and fluently topic-specific outputs (e.g., text and/or images). In many instances, a generative model refers to an advanced computational system that uses natural language processing, machine learning, and/or image processing to generate coherent and contextually relevant human-like responses.

Generative AI models have applications in natural language understanding, content generation, text summarization, dialog systems, language translation, creative writing assistance, image generation, audio generation, and more. A single generative AI model often performs a wide range of tasks by receiving different inputs, such as prompts (e.g., input instructions, rules, example inputs, example outputs, and/or tasks), data, and/or access to data. In response, the generative AI model generates various output formats ranging from one-word answers to long narratives, images and videos, labeled datasets, documents, tables, and presentations.

Moreover, generative AI models are primarily based on transformer architectures to understand, generate, and manipulate human language. generative AI models can also use other types of architectures such as recurrent neural network (RNN) architecture, long short-term memory (LSTM) model architecture, convolutional neural network (CNN) architecture, or other types of architectures. Examples of generative AI models include generative pre-trained transformer (GPT) models such as GPT-3.5 and GPT-4, bidirectional encoder representations from transformers (BERT) model, text-to-text transfer transformer models like T5, conditional transformer language (CTRL) models, and Turing-NLG. Other types of generative AI models include sequence-to-sequence models (Seq2Seq), vanilla RNNs, and LSTM networks. In some instances, a generative AI model includes a large language model (LLM), which serves as a text-based version of a generative AI model, such as a generative AI model that receives text prompts and/or generates text outputs. In various implementations, a generative AI model is a multimodal generative model that receives multiple input formats (e.g., text, images, video, data structures) and/or generates multiple output formats.

As an example, the terms "prompt," "model prompt," or "generative AI model prompt" refer to a request provided to a large generative image model to create a generative AI model output based on a plain language guidance prompt. In some instances, the generative document system provides additional information with a prompt. A prompt can include a user-level prompt that includes a user request or a systemlevel or meta-level prompt that provides important contextual information and/or general framing information to ensure that the generative AI model understands the correct context, syntax, and grounding information of the data it is processing. Examples of prompts include a search intent prompt that includes instructions to generate a set of topic sections based on a set of search result links corresponding to a search query, a topic section prompt that includes instructions to generate a curated topic section with text and linked citations, and a generative document prompt that includes instructions to generate a generative text document with a directed answer followed by one or more curated topic sections.

As an example, the term "search link results" refers to links (e.g., hyperlinks) and their corresponding resources that are obtained in response to a search query (e.g., a user-requested search query). In various implementations, providing search link results to a generative AI model enables the model to access resources, summaries, and/or metadata associated with the links. In various implementations, a set of search link results includes a ranked order of results based on scores given to each result according to its correlation with a search query. Search link results can include any number of results corresponding to a search query.

As an example, the term "generative text document" refers to a search-based document that includes curated text narrative responses corresponding to a search query and its corresponding set of search result links. In many implementations, a generative text document includes topic sections that correspond to a search query and a set of search result links based on the search query. For example, topic sections include responses that answer portions of a search query and/or alternative search queries. In some instances, a topic section is curated, meaning it is generated by a generative AI model to provide one or more sentences that include streamlined information about the topic supported by citations linked to the search result links.

A generative text document can include an unformatted generative text document that includes bodies of text narrative responses (e.g., text responses written in a plain language narrative) laid out in one or more topic sections. In this document, "unformatted" refers to no grid layout properties but is structured to appear like a typical text document. In some implementations, a generative text document is part of a search engine results page (SERP) along with a corresponding set or list of search result links.

As another example, the term "answer card" refers to an element that provides direct answers to a search query or sub-queries derived from the search query. Answer cards provide quick, accurate answers to questions without requiring further search or interaction by a user. Answer cards can include text, images, audio, video, and/or animations to convey a quick answer. In addition, answer cards may include various versions that include different granularities of information and/or have different layout dimensions (e.g., available dimensions). Furthermore, answer cards include metadata and/or other grounding information to allow a generative AI model to understand the context associated with the card.

Implementation examples and details of the generative document system are discussed in connection with the accompanying figures, which are described next. For example, FIG. 1 illustrates an overview of the generative document system using generative AI models to create a generative text document for a search query according to some implementations. While FIG. 1 provides a high-level overview of the invention, additional details are provided in subsequent figures.

FIG. 1 illustrates a series of acts 100 performed by or following directions from the generative document system. As shown, the series of acts 100 briefly illustrates an example of how the generative document system uses generative AI models to generate outputs that are used in subsequent generative AI model prompts. These generative AI model outputs are combined to build or create a generative text document.

As shown, the series of acts 100 includes act 102 of obtaining query links from a search grounding system in response to receiving a search query from a client device. In various implementations, the generative document system receives a search query from a client device, such as when a user provides a search request to a search results system. In response, the generative document system provides the search query to a search grounding system to generate and return a set of search result links. These search result links provide basic grounding information for the search query.

Act 104 includes using the search query and search result links to generate a list of query topics. For instance, the generative document system generates and provides a prompt to a generative AI model instructing it to determine one or more intents of the search query and to generate topic sections based on these intents. The prompt may be a search intent prompt that includes the search query and the set of search result links. Additional details regarding using a generative AI model to determine topic sections for a search query are provided below in connection with FIGS. 3A and 3B.

Act 106 includes generating a set of curated topic sections that include curated text and citation links. For example, the generative document system generates and provides a prompt to the same or different generative AI model instructing it to curate each topic section. The prompt may be a topic section curation generative AI model prompt that includes the search query, additional queries specific to a target topic section, and search result links obtained for the target topic section. In many instances, a curated topic section includes text descriptions supported by linked citations corresponding to search result links for the topic section. Additional details regarding using a generative AI model to generate curated topic sections are provided below in connection with FIGS. 4A and 4B.

Act 108 includes merging the curated topic sections into a generative text document that includes a directed answer to the search query. For instance, the generative document system generates and provides a prompt to the same or different generative AI model instructing it to create a generative text document that includes a directed answer and selected topic sections. For example, the prompt is a generative document prompt that includes the search query and curated topic sections. Additional details regarding using a generative AI model to create generative text documents are provided below in connection with FIGS. 5A and 5B.

Figure 2:
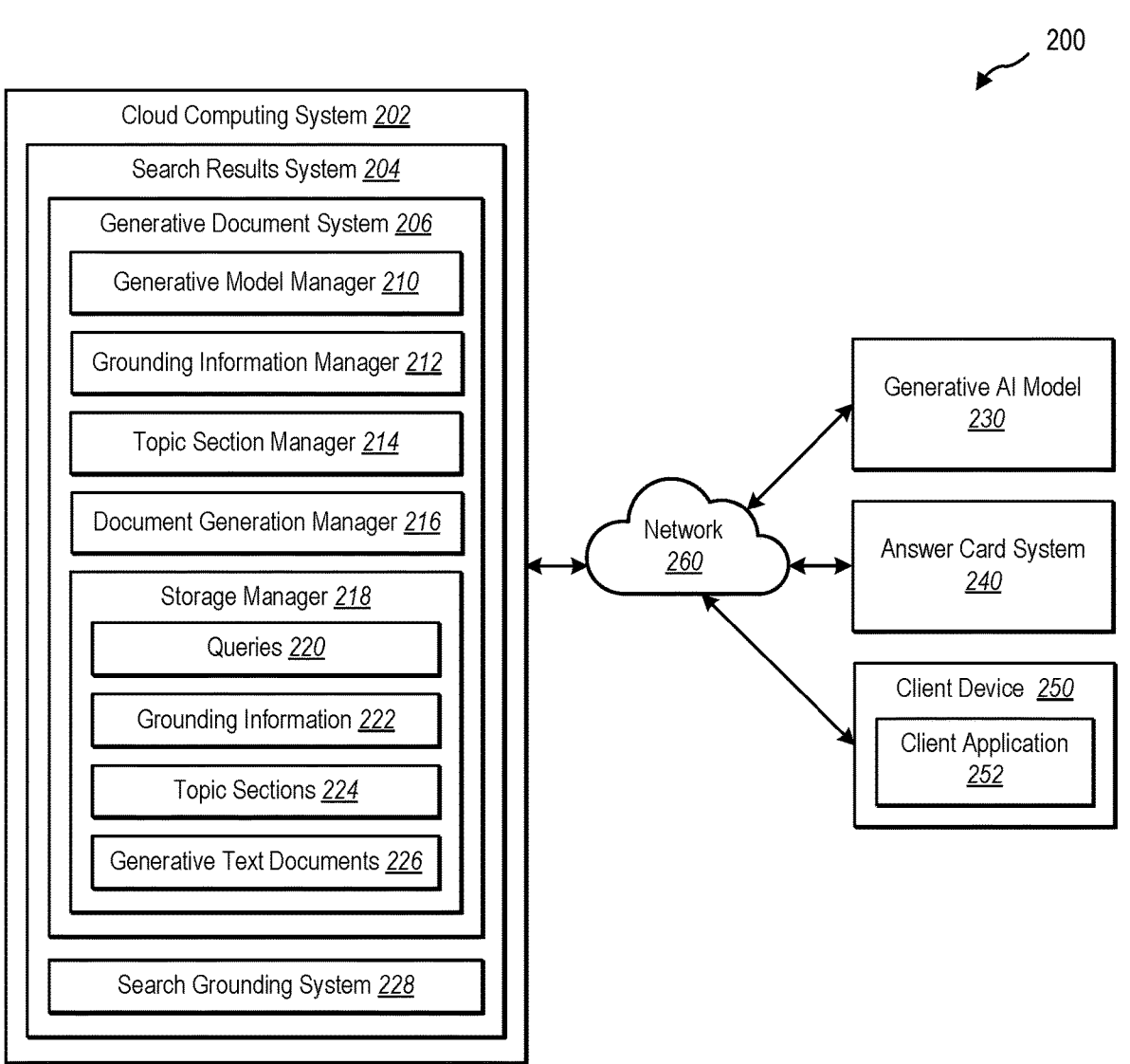
FIG. 2 illustrates an example computing environment where the generative document system is implemented.

With a general overview in place, additional details are provided regarding the components, features, and elements of the generative document system. To illustrate, FIG. 2 shows an example computing environment where the generative document system is implemented according to some implementations. In particular, FIG. 2 illustrates an example of a computing environment 200 of various computing devices including a cloud computing system 202 associated with a generative document system 206. While FIG. 2 shows example arrangements and configurations of the computing environment 200, the cloud computing system 202, the generative document system 206, and associated components, other arrangements and configurations are possible.

As shown, the computing environment 200 includes a cloud computing system 202 associated with the generative document system 206, a generative AI model 230, an answer card system 240, and a client device 250 with a client application 252, connected via a network 260. Many of these components may be implemented on one or more computing devices, such as on one or more server devices. Some of these components may be implemented on a personal device. Further details regarding computing devices are provided below in connection with FIG. 7, along with additional details regarding networks, such as the network 260 shown.

Before describing components of the cloud computing system 202 including the generative document system 206, other components of the computing environment 200 are first discussed to provide better context when discussing the generative document system 206. As shown, the computing environment 200 includes the generative AI model 230, which creates generative outputs (e.g., generative AI model outputs) of various types and/or formats, and prompt inputs (e.g., generative AI model prompts). For example, the generative AI model 230 generates topic sections 224 (e.g., a list of topic sections for a search query), curated topic sections, and generative text documents 226 in response to different prompts.

The generative AI model 230 represents a single generative AI model or a set of multiple generative AI models (e.g., one or more large generative models (LGMs) and/or one or more small generative models (SGMs)). In some implementations, the generative AI model 230 represents multiple instances of the same generative AI model. In some implementations, the generative AI model is a text-based generative AI model or a large text-only generative model that inputs and outputs text inputs (e.g., no images or audio). In various implementations, when the generative AI model 230 is primarily or exclusively text-based, it runs more efficiently and also returns results more quickly than multimodal-based models.

As shown, the computing environment 200 includes the answer card system 240, which receives answer card requests and returns lists of candidate answer cards corresponding to a search query, topic, or a portion of a search query. In various implementations, a list or set of candidate answer cards is ranked according to quality, engagement, or another metric. In some instances, the answer card system provides properties, such as display sizes, dimensions, media types, rendering metadata, and/or grounding data for one or more answer cards.

As shown, the computing environment 200 includes the client device 250. In various implementations, the client device 250 is associated with a user (e.g., a user client device), such as a user who requests a search query. In various instances, the client device 250 includes a client application 252, such as a web browser, mobile application, or another form of computer application for accessing and/or interacting with the cloud computing system 202 and/or the generative document system 206. For example, the client device 250 interacts with generative content (e.g., text narrative responses and corresponding answer cards) within a formatted generative text document via the client application 252.

Returning to the cloud computing system 202, as shown, the cloud computing system 202 includes a search results system 204 and a search grounding system 228. In various implementations, the search grounding system 228 returns a set of search result links in response to a search request. In various implementations, a set of search results includes one or more ranked search result links. In some implementations, the search grounding system 228 also returns linked content and answers along with search result links in response to a search query.

In various implementations, the search results system 204 provides search results in response to a search query. For example, the client device 250 submits a search request, and the search results system 204 returns search result links provided by the search grounding system 228, generative text document generated by the generative document system 206, and/or additional generative content.

As shown, the search results system 204 implements the generative document system 206. In some implementations, the generative document system 206 is located on a separate computing device from the search results system 204 within the cloud computing system 202 (or apart from the cloud computing system 202). In various implementations, the search results system 204 operates without the generative document system 206.

In various implementations, including the illustrated implementation, the generative document system 206 includes various components and elements that are implemented in hardware and/or software. For example, the generative document system 206 includes a generative model manager 210, a grounding information manager 212, a topic section manager 214, a document generation manager 216, and a storage manager 218. The storage manager 218 includes queries 220, grounding information 222, topic sections 224, and generative text documents 226.

As mentioned, the generative document system 206 includes the generative model manager 210, which communicates with the generative AI model 230 to generate generative AI model outputs corresponding to search queries. In various implementations, the generative model manager 210 communicates with other components of the generative document system 206 to provide prompts and inputs to the generative AI model 230 and receive generative AI model outputs.

The generative document system 206 also includes the grounding information manager 212, which communicates with the search grounding system 228 to obtain grounding information 222 for queries 220. Queries 220 can include a search query (i.e., a main query), topic section queries, and alternative topic section queries. In some implementations, the grounding information manager 212 obtains only a set of search result links as grounding information. In other instances, the grounding information manager 212 obtains search result links, linked content, and/or answers as grounding information.

Additionally, the generative document system 206 includes the topic section manager 214, which implements the generation of topic sections 224. In one or more implementations, the document generation manager 216 provides inputs (e.g., grounding information 222) and a generative AI model prompt to the generative AI model 230 (e.g., via the generative model manager 210) to generate a list of topic sections that include topic titles, topic section queries, and alternative topic section queries. Additionally, the generative document system 206 provides inputs and a generative AI model prompt to the generative AI model 230 to generate curated topic sections, as described further below.

The generative document system 206 includes the document generation manager 216, which builds generative text documents 226 from the topic sections 224. For instance, the generative document system 206 provides inputs and a generative AI model prompt to the generative AI model 230 (e.g., via the generative model manager 210) to generate a generative text document that provides a streamlined, organized, and curated response to the search query. In some implementations, the document generation manager 216 provides generative text documents 226 to the search results system 204 to be displayed (e.g., as part of a search engine results page (SERP) shown on the client device 250) and/or provided to downstream applications.

Turning to the next set of figures, FIGS. 3A-3B, 4A-4B, and 5A-5B illustrate example sequence and block diagrams that focus on different interactions between the generative document system 206 and one or more generative AI models to build a generative text document. In part, these figures show different communications (e.g., via the network 260) between the generative document system 206, the search grounding system 228, and the generative AI model 230.

Figure 3A:
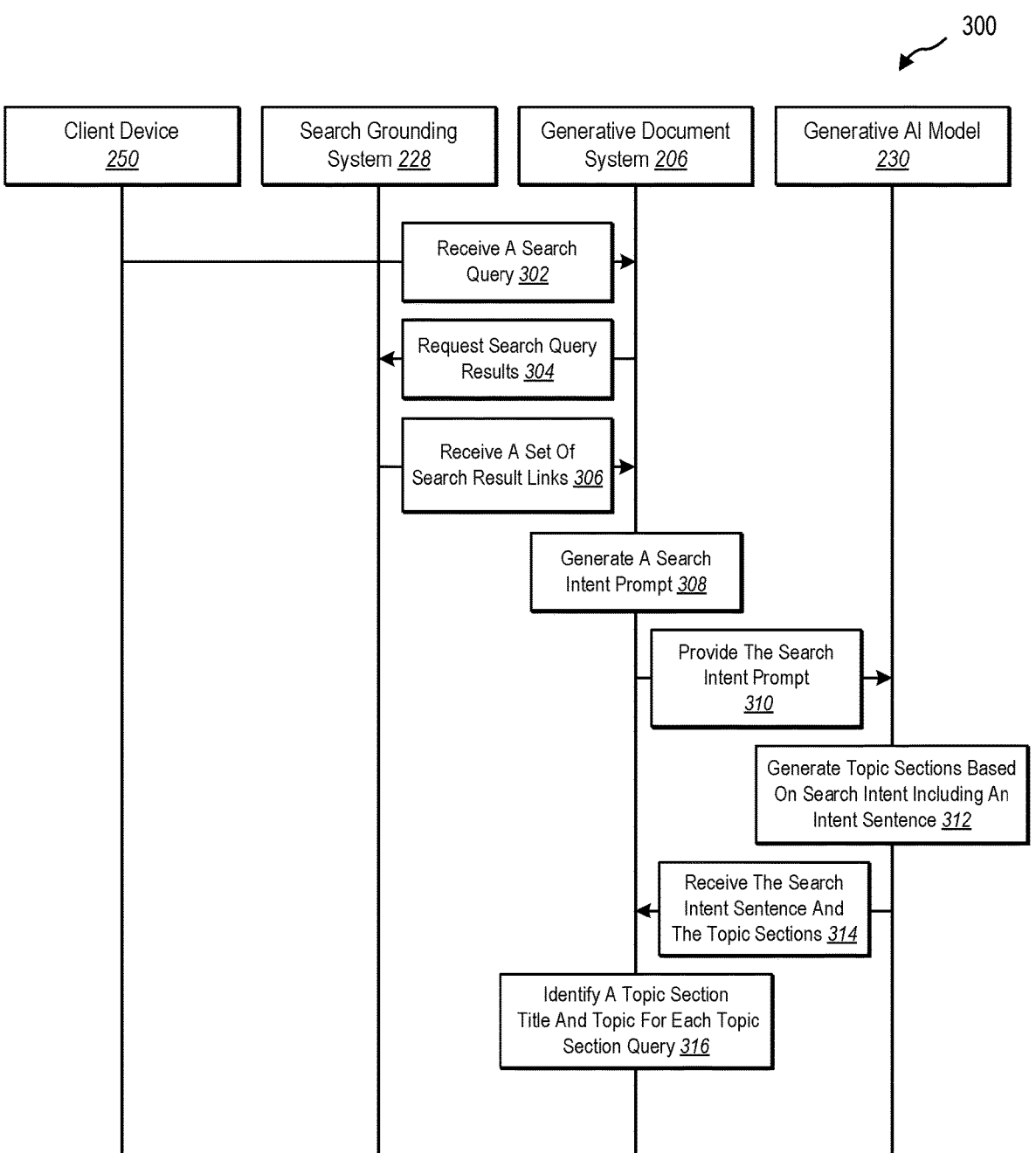
FIGS. 3A-3B illustrate example sequence and block diagrams of using a generative AI model to generate topic sections for a search query.
Figure 3B:
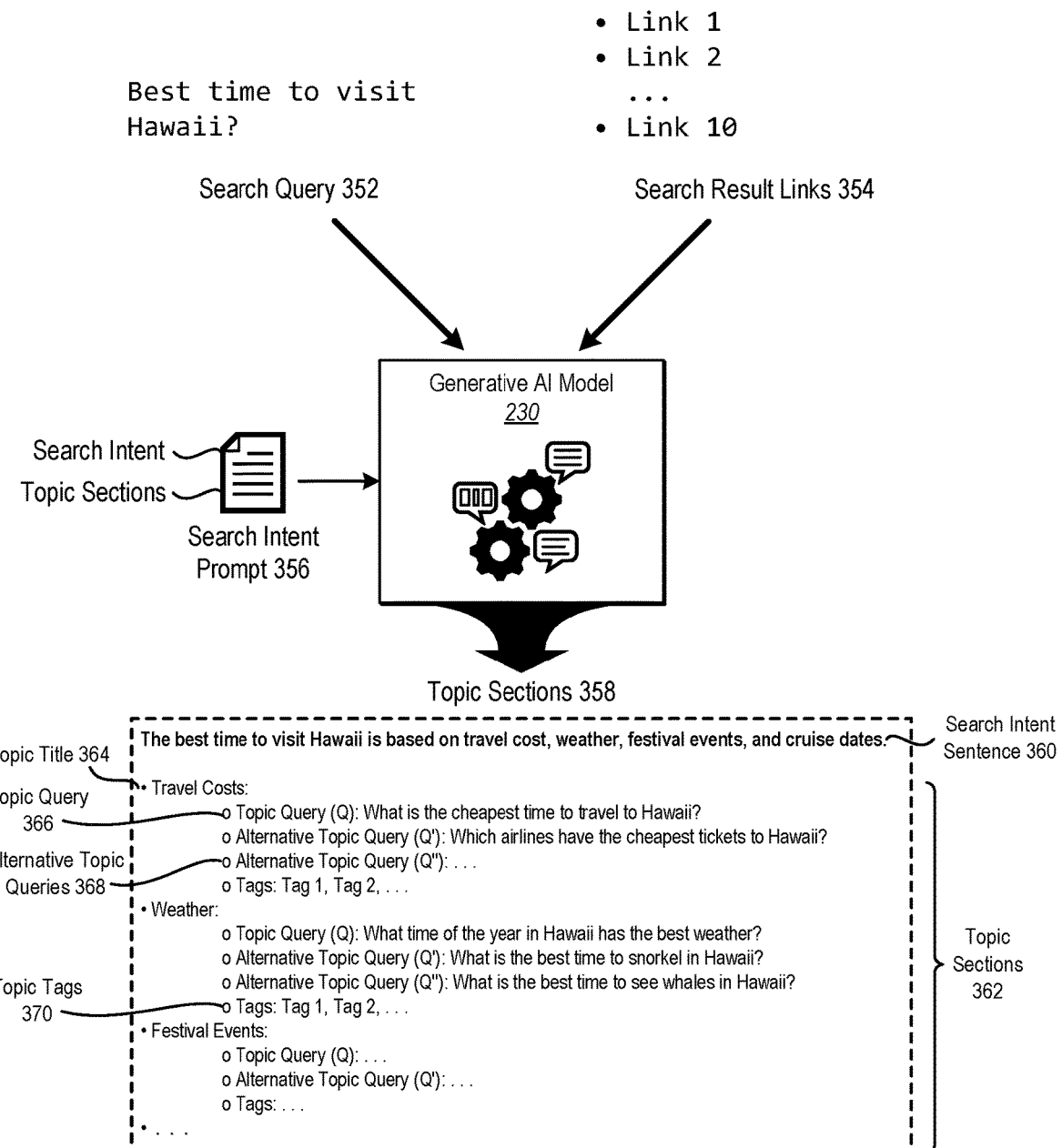

To begin, FIG. 3A illustrates an example sequence diagram of using a large generative model to generate topic sections for a search query according to some implementations, while FIG. 3B illustrates a corresponding block diagram with an example list of generated topic sections. As shown, FIG. 3A includes a series of acts 300 performed by or with the generative document system 206. In some implementations, the series of acts 300 may include fewer or different acts (e.g., some of the acts may be skipped or omitted). Additionally, in some instances, the acts in the series of acts 300 are performed in a different order.

As shown, the series of acts 300 begins with act 302 of the generative document system 206 receiving a search query from the client device 250. For example, based on a user's interaction, the client device 250 sends a search query requesting search results for a topic or question. For instance, the user enters a search question into the search field of a search engine via a web browser.

Act 304 shows the generative document system 206 requesting search query results from the search grounding system 228. In response, the search grounding system 228 provides the generative document system 206 with a set or list of links (e.g., search result links) to websites and/or resources corresponding to the search query. Act 306 includes the generative document system 206 receiving a set of search query results from the search grounding system 228. In various implementations, the search grounding system 228 quickly provides only the search result links without additional content or answers. In some implementations, the search query is directly provided to the search grounding system 228, which then provides the search result links to the generative document system 206.

Act 308 shows the generative document system 206 generating a search intent prompt. In one or more implementations, the generative document system 206 generates a prompt that instructs the generative AI model to determine a search intent for the search based on the search query and/or the set of search result links. For example, the search intent prompt provides instructions for the generative AI model 230 to analyze the search query and generate a set or list of candidate intents behind the search query and, in some instances, order the list by rank.

In some implementations, the prompt also includes instructions for the generative AI model to determine a list of topic sections based on the inputs and/or the search intent. The prompt may include a minimum or maximum number of topic sections to be included in the list. Additionally, the prompt includes instructions to generate a search intent sentence that lists the identified topics. In some instances, the prompt instructs the generative AI model to output the search intent sentence followed by the list of topic sections. In various implementations, the topics in the list and/or the search intent sentence are listed in ranked order from highest to lowest rank based on their relevance to the search query.

Act 310 includes the generative document system 206 providing the search intent prompt to the generative AI model 230. For instance, the generative document system 206 provides the search intent prompt along with the search query and the set of result links (either within the search intent prompt or as separate data).

This and each prompt sent to a generative AI model may include or may be accompanied by a system prompt that includes guardrails that enforce responsible artificial intelligence (RAI) rules and policies. Additionally, each prompt sent to a generative AI model may include additional context information, such as language and region information.

Act 312 includes the generative AI model 230 generating topic sections based on search intent, including a search intent sentence. As mentioned, by following the instructions on the search intent prompt, the generative AI model 230 determines one or more search intents and generates a list of topic sections based on those search intents. Additionally, the generative AI model 230 may generate topic titles and topic search queries (including alternative search queries) for each topic section. The generative AI model 230 then generates a generative AI model output following the instructions in the prompt. For example, the generative AI model 230 generates a plain text document or block of text that includes a search intent sentence and a bullet point list of topics.

Act 314 includes the generative document system 206 receiving the search intent sentence and the topic sections. In response, the generative document system 206 may identify, separate, and/or prepare each topic section. To illustrate, act 316 includes the generative document system 206 identifying a topic title and topic for each topic section. For example, for each of the topics, the generative document system 206 identifies its title, topic search query, any alternative search queries, and any additional content associated with the topic.

FIG. 3B illustrates an example of generating a topic section generative AI model output according to some implementations. FIG. 3B provides examples of various elements and outputs introduced above. For example, FIG. 3B includes the generative AI model 230 receiving a generative AI model prompt and other generative AI model inputs and generating a generative AI model output. For context, in FIG. 3B, the generative document system 206 provides the generative AI model inputs and receives the generative AI model outputs.

To illustrate, FIG. 3B includes the generative document system 206 providing a search intent prompt 356 to the generative AI model 230 along with a search query 352 and search result links 354. As shown, the search intent prompt 356 includes instructions corresponding to determining a search intent and topic sections, as described above. In addition, the search query 352 requests the best time to visit Hawaii and the search result links 354 represent web links associated with the search query 352.

In response, the generative AI model 230 generates, outputs, and returns the topic sections 358. As shown, the topic sections 358 include a search intent sentence 360 and a topic section list 362. The topic section list 362 includes multiple topics, each having a topic title 364, topic query 366, alternative topic queries 368, and topic tags 370. As shown, the search intent sentence 360 and the topic section list 362 may be ranked from highest to lowest ranking.

In various implementations, the generative AI model 230 generates topic-based queries. For example, for each topic, the generative AI model 230 generates a directed or targeted search query. These topic search queries may be considered sub-queries to the main search query (i.e., the search query 352). Additionally, in various instances, the generative AI model 230 generates alternative topic queries 368. Alternative topic queries diversify a topic and may supplement a topic query, include a related search topic, or provide an opposite view (e.g., "What is the most expensive time to fly to Hawaii?"). In various implementations, alternative topic queries are ranked from highest usefulness, relevancy, and/or correlation strength (positive or negative) to least.

Figure 4A:
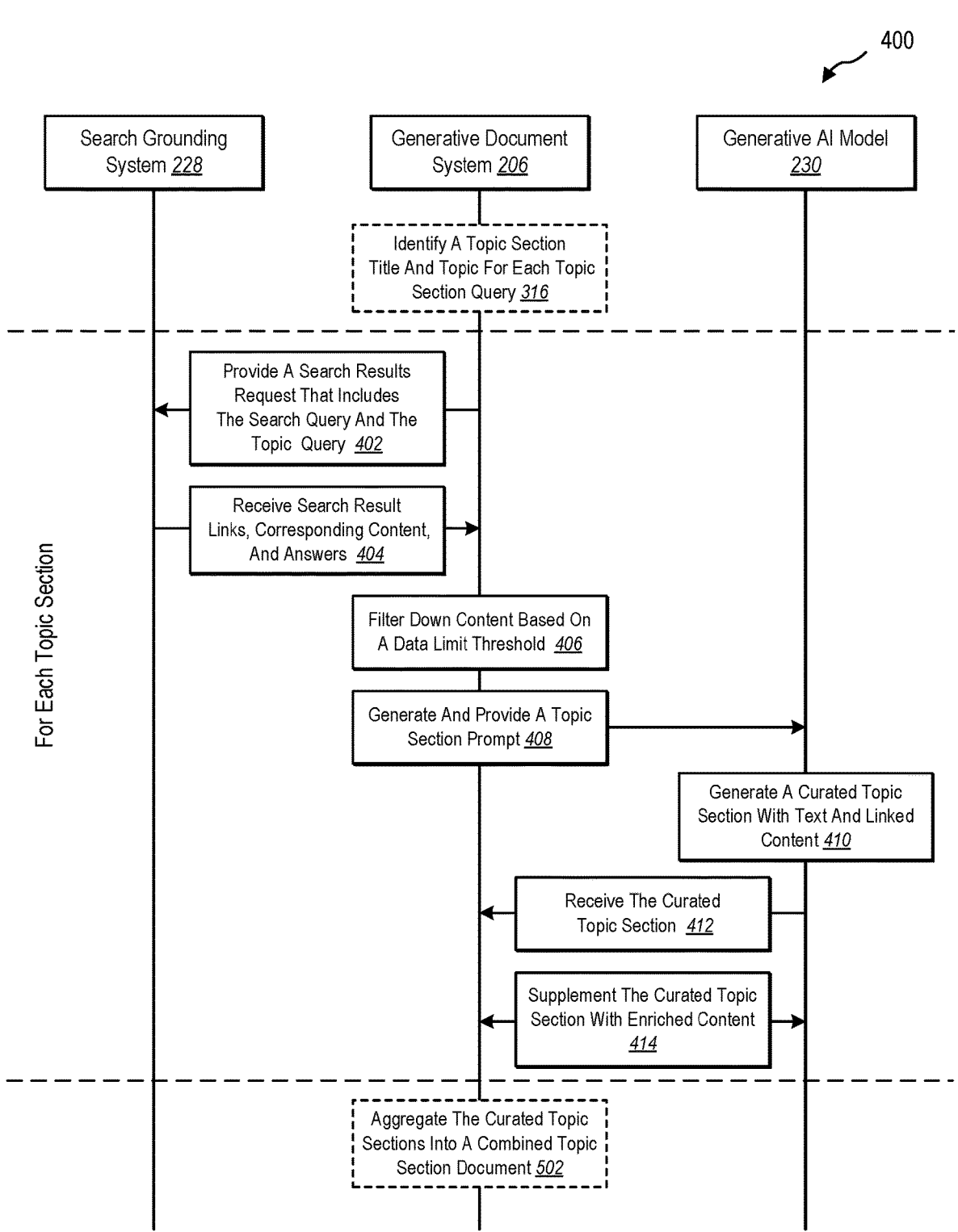

FIG. 4A illustrates an example sequence diagram of using a large generative model to generate curated topic sections for the search query according to some implementations, while FIG. 4B illustrates a corresponding block diagram with an example curated topic section. As shown, FIG. 4A includes a series of acts 400 performed by or with the generative document system 206. In some implementations, the series of acts 400 may include fewer or different acts (e.g., some of the acts may be skipped or omitted). Additionally, in some instances, the acts in the series of acts 400 are performed in a different order.

Notably, the series of acts 400 corresponds to actions that the generative document system 206 performs for one or more topic sections (e.g., for each topic section). For example, the series of acts corresponds to a target topic. The generative document system 206 may perform multiple instances of the series of acts 400 in parallel or concurrently for different topics in the list of topic sections. Additionally, for context, FIG. 4A shows act 316 from FIG. 3A where the generative document system 206 identifies a topic title and topic for each topic section. It also shows a future act, act 502, corresponding to aggregating the curated topic sections, which will be described in FIG. 5A. The series of acts 400 may follow act 316 and lead into act 502.

As shown, the series of acts 400 begins with act 402 of the generative document system 206 providing a search results request that includes the search query and the topic query. For example, the generative document system 206 provides one or more requests to the search grounding system 228 that include the search query and the topic query for the target topic. In various instances, the generative document system 206 also provides one or more of the alternative topic queries. In some cases, the generative document system 206 also provides topic tags to the search grounding system 228 as part of the request.

In one or more implementations, the request includes a call for relevant search result links to be returned as grounding information along with linked content and/or answers. For example, in some instances, the request is a search result links-only request (similar to act 304 above). In other instances, the request is for grounding information that includes search result links and corresponding content found at or associated with the links. Additionally, the request includes a call for answers to the search query, topic query, and/or alternative topic queries to be identified and returned.

Act 404 includes the generative document system 206 receiving search result links, corresponding content, and answers from the search grounding system 228. As mentioned, in some implementations, the search grounding system 228 determines and provides additional information corresponding to a search result, such as answers. For example, for frequently searched queries, the search grounding system 228 provides general answers. In some instances, the search grounding system 228 also provides answer snippets from the search result links and/or other knowledge base sources. In one or more implementations, an answer includes a top answer (e.g., the most popular or widely accepted response to a question or query) or a carousel/pole answer (e.g., multiple cards arranged horizontally or vertically where each card represents a piece of content), both of which are discussed further below.

Act 406 includes the generative document system 206 filtering down content based on a data limit threshold. For instance, the generative document system 206 receives a large amount or volume of grounding information for a target topic. In these instances, the generative document system 206 may need to filter the amount of data below a data limit threshold. In some cases, the data limit threshold corresponds to a token limit or input data limit for the generative AI model 230. For example, the generative document system 206 may aggregate all the grounding information into a single file or data structure and cut off any grounding information beyond the data limit threshold. In some cases, the data limit threshold corresponds to a number of search result links, linked content characters, or answers.

If filtering needs to occur, the generative document system 206 may use different approaches. One approach is the direct priority approach. In this approach, the generative document system 206 includes all grounding information from the search query first, then from the topic query, followed by each alternative topic query, until the data limit threshold is reached.

Another approach is a round-robin priority approach. In this approach, grounding information from the search query, the target topic query, and one or more alternative topic queries is separated and ranked. Then, the generative document system 206 performs a first selection round by selecting the top-ranked grounding information from the search query, then the top-ranked grounding information from the topic query, then the top-ranked grounding information from the top alternative topic query, and the top-ranked grounding information from the next ranked alternative topic queries (selecting the highest-ranked content from each of the ranked lists).

Continuing, after grounding information has been selected from this first round, the generative document system 206 performs a second selection round by selecting the next highest-ranked pieces of grounding information for the search query, the topic query, and the alternative topic queries (by rank). The generative document system 206 repeats this process of selecting the next highest-ranked content until the data limit threshold is reached (e.g., selecting the next highest-ranked content from each of the ranked lists until the data limit threshold is met or satisfied).

In some implementations, the generative document system 206 employs a modified round-robin priority approach by only selecting grounding information associated with the search query and the topic query for a set number of rounds before including grounding information from the alternative topic queries. In some instances, the generative document system 206 selects from only a subset (e.g., less than all) of the alternative topic queries in a given round.

Act 408 includes the generative document system 206 generating and providing a topic section prompt to the generative AI model 230. For instance, the generative document system 206 generates a topic section prompt with instructions to curate the provided grounding information into a streamlined, digestible text response that includes linked citations. In some instances, the prompt also includes example output samples and/or potential text output structures (e.g., paragraph, list, table, or another form).

In one or more implementations, the generative document system 206 provides the topic section prompt to the generative AI model 230 along with other generative AI model inputs. For example, the generative document system 206 provides the topic grounding information. In various implementations, the grounding information is provided as filtered content, as described above (e.g., grounding information up to a data limit threshold). Additionally, in some instances, other generative AI model inputs include the search query, topic title, topic query, alternative topic queries, and search intent sentence.

Act 410 includes the generative AI model 230 generating a curated topic section with text and linked content. For example, the generative AI model 230 follows the instructions in the prompt to generate a curated topic section that distills the grounding information (e.g., filtered or unfiltered) for the target topic into a single sentence or short paragraph of a few sentences (e.g., 3-5 sentences). Furthermore, the generative AI model 230 generates a text response using a natural language tone and style. In some cases, the generative AI model 230 generates a table or list as part of the curated topic section response.

As part of generating a curated topic section response, the generative AI model 230 also includes links to support the assertions made in the response. In addition to ensuring high accuracy, linked content has the additional benefit of allowing a user to further explore the topic using the provided links.

Act 412 includes the generative document system 206 receiving the curated topic section from the generative AI model 230. For instance, the generative AI model 230 provides the generative document system 206 with a document or data structure that includes the topic section text response (i.e., the curated topic section), including linked citations.

Act 414 includes supplementing the curated topic section with enriched content using the generative AI model 230. In various implementations, the generative document system 206 utilizes the generative AI model 230 or other systems or models to further enrich a curated topic section. For example, enriched content may request additional queries (e.g., answer queries, section suggestions, personalization queries, and image queries) from generative AI models or other systems and use the retrieved content (e.g., enriched grounding information) to enrich the target curated topic section. In some instances, the generative document system 206 uses the generative AI model 230 again to add the enriched content and/or enriched grounding information to the curated topic section.

FIG. 4B illustrates an example of generating a curated topic section according to some implementations. FIG. 4B provides examples of various elements and outputs introduced above. For example, FIG. 4B includes the generative AI model 230 receiving a generative AI model prompt and other generative AI model inputs and generating a generative AI model output. For context, in FIG. 4B, the generative document system 206 provides the generative AI model inputs and receives the generative AI model outputs. Additionally, like FIG. 4A, FIG. 4B highlights actions of a target topic section and may be repeated and/or duplicated for other topic sections.

To illustrate, FIG. 4B includes the generative document system 206 providing a topic section prompt 456 (e.g., a topic curation generative AI model prompt) for a target topic section to the generative AI model 230 along with other generative AI model inputs, which include the search query 352, the topic query 366, the alternative topic queries 368, and topic grounding information 454. In various implementations, the grounding information is provided as filtered content or filtered grounding information limited to less data than a data limit threshold. In various implementations, the topic section prompt 456 includes additional context, such as the search intent sentence and the topic title. In some instances, this context information is provided in separate inputs from the topic section prompt 456.

In response, the generative AI model 230 generates, outputs, and returns a curated topic section 458. As shown, the curated topic section 458 includes topic section text 460 with a curated topic title and a curated text response. In some implementations, the curated topic section 458 also includes citation links 462 that correspond to portions of the topic section text 460, as mentioned above.

Figure 5A:
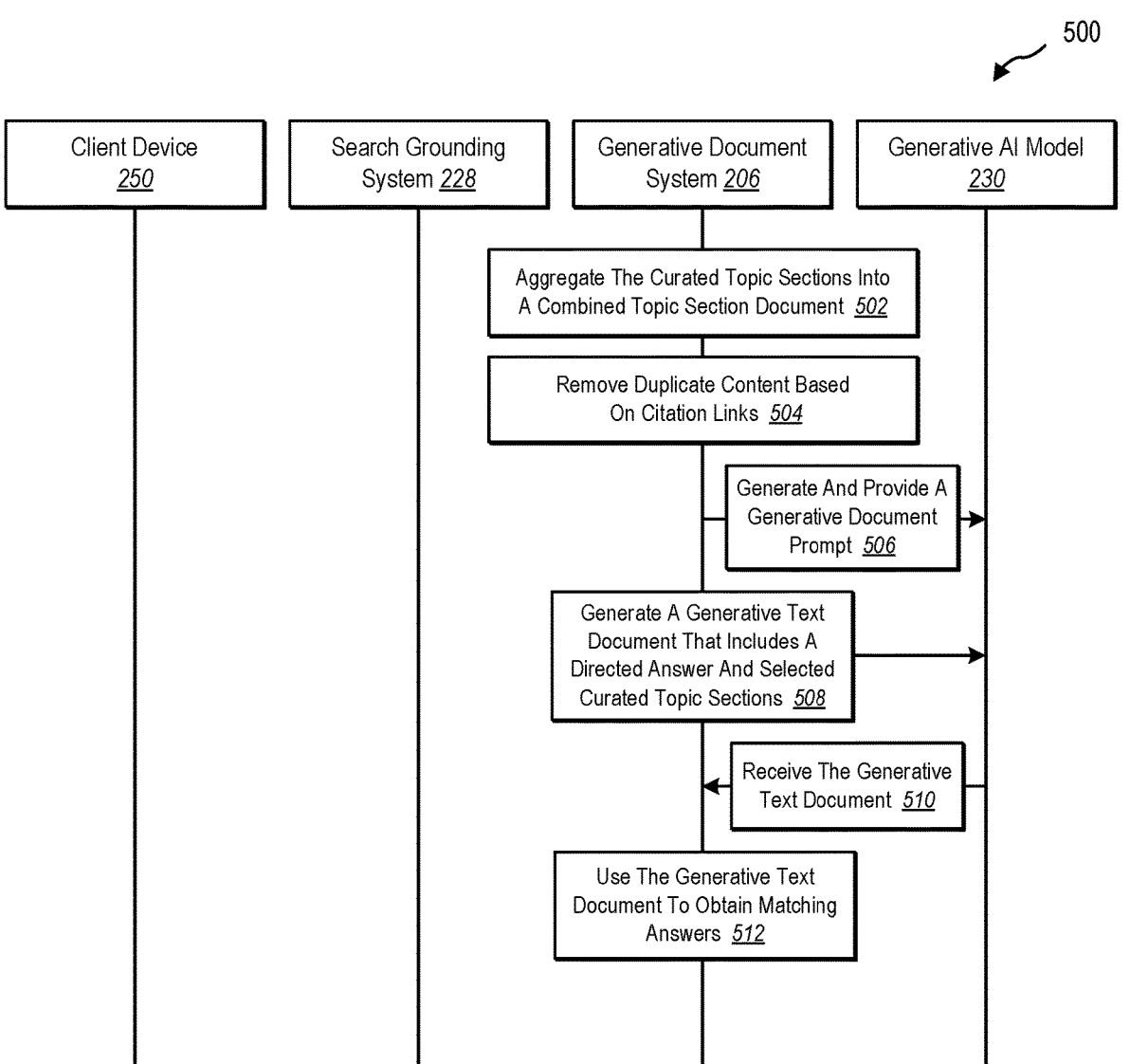

FIG. 5A illustrates an example sequence diagram of using a large generative model to generate a generative text document for the search query according to some implementations, while FIG. 5B illustrates a corresponding block diagram with an example generative text document. As shown, FIG. 5A includes a series of acts 500 performed by or with the generative document system 206. In some implementations, the series of acts 500 may include fewer or different acts (e.g., some of the acts may be skipped or omitted). Additionally, in some instances, the acts in the series of acts 500 are performed in a different order.

As noted above, the series of acts 500 may continue after the series of acts 400 described in connection with FIG. 4A. As shown, the series of acts 500 begins with act 502 of the generative document system 206 aggregating the curated topic sections into a combined topic section document. For example, the generative document system 206 combines each of the curated topic sections into a single document or data structure. In various implementations, the generative document system 206 combines the curated topic sections according to their rank or ensures that each curated topic section is associated with a topic rank.

Act 504 includes the generative document system 206 removing duplicate content based on citation links. For instance, the generative document system 206 removes, eliminates, or trims duplicate content and citations that repeat in multiple topic sections. For example, in various implementations, the generative document system 206 identifies matches between phrases or sentences between different curated topic sections in the combined topic section document. In many but not all implementations, the matched content will link to the same search result link. The generative document system 206 then determines which curated topic section is higher ranked and removes the duplicate content from the lower-ranked curated topic section.

In some implementations, the generative document system 206 uses search result links to identify duplicate or semantically similar content in different curated topic sections. For example, when multiple topic sections cite the same link, the generative document system 206 identifies the content within each section that cites the link. In these instances, the generative document system 206 can compare the different pieces of content to determine semantic similarities and remove all matching instances except for the instance in the highest-ranked curated topic section.

Act 506 includes the generative document system 206 generating and providing a generative document prompt to the generative AI model 230. For instance, the generative document system 206 creates a generative document prompt with instructions to generate a generative text document for the search query using the provided curated and trimmed topic sections. For example, the generative document prompt includes instructions to generate a directed answer to the search query and to select one or more curated topic sections to include. In some instances, the generative document prompt includes instructions on how to select some or all of the curated topic sections that are provided as a generative AI model input. In some instances, the prompt also includes example output samples of text outputs.

As with other calls to a generative AI model described above, the generative document system 206 provides the generative document prompt to the generative AI model 230 along with other generative AI model inputs. For example, the generative document system 206 provides the search query, the combined topic section document (before or after duplicate content has been removed), and the search intent sentence (e.g., to keep the model focused on the search intent and determine which topics are more important).

Act 508 includes the generative AI model 230 generating a generative text document with a directed answer and selected curated topic sections. For example, the generative AI model 230 follows the instructions in the prompt to generate a directed answer that briefly addresses and answers the search query. In some implementations, the directed answer is a top answer proven to be a widely accepted response to the search query. In some implementations, the directed answer is a carousel/pole answer that includes multiple cards listing the cast of a movie in response to a search query about who was in the movie.

In various implementations, the generative AI model 230 selects a subset of curated topic sections included in a provided combined curated topic section document. For example, the generative AI model 230 deduplicates or removes curated topic sections that semantically duplicate a section. For example, the combined curated topic section document includes five curated topic sections and the generative AI model 230 determines to select three sections while removing repetitive sections. In various implementations, the generative AI model 230 removes lower-ranked duplicate or repetitive curated topic sections.

As mentioned above, the generative AI model 230 generates a directed answer. The generative AI model 230 may modify, select, or deselect a curated topic section based on the directed answer. For example, if the directed answer is a top answer, the generative AI model 230 is provided with instructions in the generative document prompt to remove a curated topic section that is a duplicate or copy of the same answer. However, if the directed answer is a pole/carousel answer, then the generative AI model 230 is instructed to select curated topic sections that supplement some or all of the directed answer without significantly duplicating content. In general, regardless of the directed answer type, the generative AI model 230 is instructed to avoid and/or minimize providing duplicate content and answers in the generative text document.

In some implementations, the generative AI model 230 modifies the text within the selected topic sections. For example, the generative AI model 230 adds an introductory paragraph that ties together the following selected topic sections. In various implementations, the generative AI model 230 includes and/or adds transitions between adjacent sections of the selected topic sections. In some instances, the generative AI model 230 determines that the pre-curated order no longer applies and reorders the curated topic sections in the generative text document to improve flow and readability.

Act 510 includes the generative document system 206 receiving the generative text document. In some instances, the generative document system 206 provides the generative text document to the client device 250 for display to the requesting user. In one or more implementations, the generative document system 206 further enhances and supplements the generative text document before providing it to the client device 250.

To illustrate, in some implementations, the generative document system 206 uses the generative text document to obtain matching answer cards, as shown in act 512. For example, the generative document system 206 provides the generative text document to an answer card system and receives a set or list of answer cards that match or correspond to content in one or more of the selected topic sections within the generative text document. In some implementations, the generative document system 206 provides the generative text document along with matching answer cards to the client device 250.

FIG. 5B illustrates an example of generating a generative text document according to some implementations. FIG. 5B provides examples of various elements and outputs introduced above. For example, FIG. 5B includes the generative AI model 230 receiving a generative AI model prompt and other generative AI model inputs and generating a generative AI model output. For context, in FIG. 5B, the generative document system 206 provides the generative AI model inputs and receives the generative AI model outputs.

To illustrate, FIG. 5B includes the generative document system 206 providing a generative document prompt 556 to the generative AI model 230 along with other generative AI model inputs, which include the search query 352 and a combined topic section document 550. As shown, the generative document prompt 556 includes the search intent sentence, directed answer instructions, and topic section selection instructions, which are described above.

In response, the generative AI model 230 generates, outputs, and returns a generative text document 558. As shown, the generative text document 558 includes a directed answer 560 and selected topic sections 562. As also shown, the selected topic sections 562 form a streamlined, dynamic, and comprehensible set of answers to the search query complete with linked citations.

In various implementations, the generative document system 206 stores generative text documents and maintains them until they become stale or irrelevant. For example, the generative document system 206 determines whether a generative text document is outdated by comparing the search result links associated with it with the newly obtained search result links for the same search query. For instance, the generative document system 206 determines whether a threshold amount (e.g., number or percent) of links match between the stored set and the newly received set.

To elaborate, in one or more implementations, the generative document system 206 compares the top n results for the search query to the set of links in the generative text document to determine a freshness match. For example, the generative document system 206 determines that the top 3 (or 5, 10, 25, etc.) results match between the two sets. In one instance, the generative document system 206 requires an exact match. In some instances, the generative document system 206 also determines a number or percentage match, such as 3 out of the top 5 links (or another set of numbers) match.

In some implementations, the generative document system 206 also determines whether the order of the search result links has changed between the stored and new sets of search result links. For example, if the new search result links have a new order or ranking of links, the generative document system 206 determines that the stored generative text document is outdated.

In various implementations, the generative document system 206 compares whether the search result links have changed between the stored and new sets of search result links using a freshness algorithm. For example, the generative document system 206 generates a hash from the top n results (e.g., the top 3, 5, 8, or 10) of each set of search result links to generate a freshness value based on which links are included in the set and their rank or order. The generative document system 206 then compares the freshness values between the stored and new sets of search result links to determine a match. In some instances, the freshness algorithm is a fuzzy algorithm that allows for small changes between the two sets (e.g., the same links with a different order).

By using a freshness value, the generative document system 206 may store the generative text document without storing the set of search result links, which saves on computing resources. For example, when storing a generative text document of a search query, the freshness value for the generative text document is associated with the search query. Then, when the search query is searched again by a client device, the generative document system 206 needs only to compare the current freshness value of the search result with the stored freshness value to determine a match and not re-running all the calls to the generative AI model. In some implementations, the generative document system 206 verifies its freshness before retrieving a stored generative text document from a data store, which saves on bandwidth.

Turning now to FIG. 6, this figure illustrates an example series of acts of a computer-implemented method for generating one or more search results documents using one or more large generative models according to some implementations. While FIG. 6 illustrates acts according to one or more implementations, alternative implementations may omit, add to, reorder, and/or modify any of the acts shown.

The acts in FIG. 6 can be performed as part of a method (e.g., a computer-implemented method). Alternatively, a computer-readable medium can include instructions that, when executed by a processing system with a processor, cause a computing device to perform the acts in FIG. 6. In some implementations, a system (e.g., a processing system comprising a processor) can perform the acts in FIG. 6. For example, the system includes a processing system and a computer memory including instructions that, when executed by the processing system, cause the system to perform various actions or steps.

As shown, the series of acts 600 includes act 610 of obtaining search result links corresponding to a search query received from a client device. For instance, in example implementations, act 610 involves obtaining a set of search result links from a search grounding system corresponding to a search query received from a client device.

As further shown, the series of acts 600 includes act 620 of receiving topic sections from a generative AI model based on the search result links. For instance, in example implementations, act 620 involves receiving a set of topic sections from the generative AI model based on the set of search result links based on or by providing a search intent prompt and the set of search result links to a generative AI model. In various implementations, act 620 includes receiving a set of topic sections from the generative AI model determined from a ranked list of intents corresponding to the search query and the set of search result links based on or by providing a search intent prompt that includes the search query, the set of search result links, and query intent instructions to a generative AI model. In some instances, each topic section in the set of topic sections includes a topic title and a topic query.

In one or more implementations, in act 620, the search intent prompt does not include user information. In some implementations, the search intent prompt includes instructions for the generative AI model to determine a ranked list of intents for the search query based on the set of search result links, determine the set of topic sections from the ranked list of intents, and/or generate a search intent sentence that includes topic sections in the set of topic sections according to a topic section rank. In some instances, the search intent prompt includes further instructions for the generative AI model to generate the set of topic sections as a list and/or each topic section in the list includes a topic title and a topic query. In some instances, each topic section in the list also includes a set of alternative topic queries.

As further shown, the series of acts 600 includes act 630 of generating a curated topic section for a target topic section. For instance, in example implementations, act 630 involves generating a curated first topic section for a first topic section of the set of topic sections. In various implementations, act 630 includes generating curated topic sections for each topic section in the set of topic sections. In some implementations, act 630 includes obtaining multiple sets of topic section links for multiple topic sections from the search grounding system concurrently and providing multiple topic section prompts for the multiple topic sections to one or more generative AI models concurrently.

As shown further, act 630 includes two sub-acts. To illustrate, sub-act 632 includes obtaining target topic section links for the target topic section. For instance, in example implementations, sub-act 632 involves obtaining a set of first topic section links from the search grounding system. In various implementations, sub-act 632 includes receiving a set of topic section links and corresponding content in response to providing the search query and the topic query to the search grounding system.

In some implementations, sub-act 632 includes providing the search query and a first topic query to the search grounding system for the first topic section to obtain a set of first topic section content that includes a set of topic section links, a set of linked content, and a set of answers each corresponding to the first topic section. In some implementations, sub-act 632 includes providing the search query and a first topic query to the search grounding system for the first topic section to obtain a set of first topic section content that includes a set of topic section links, a set of linked content, and a set of answers each corresponding to the first topic section.

In one or more implementations, sub-act 632 includes filtering, for the first topic section, the set of first topic section content based on a data limit threshold associated with the third generative AI model. In some instances, sub-act 632 includes providing an alternative first topic query to the search grounding system along with the search query and the first topic query. In some instances, the set of first topic section content is separated into ranked lists according to the search query, the first topic query, and the alternative first topic query. In some implementations, filtering the set of first topic section content includes selecting the highest-ranked content from each of the ranked lists and/or continuing to select the next highest-ranked content from each of the ranked lists until the data limit threshold is met or satisfied.

As shown further, act 630 includes sub-act 634, which includes receiving a target curated topic section with text and linked citations from the generative AI model. For instance, in example implementations, sub-act 634 involves receiving a first curated topic section with text and linked citations based on providing a first topic section prompt that includes the first topic section and the set of first topic section links to the generative AI model. In various implementations, sub-act 634 includes receiving a curated topic section with text having linked citations from the generative AI model based on providing a topic section prompt that includes the topic title, the set of topic section links, and the corresponding content to the generative AI model. In some implementations, the first topic section prompt includes a first topic title, filtered content for the first topic section, the search query, a first topic query, and a search intent sentence for the search query.

As shown further, the series of acts 600 includes act 640 of receiving a generative text document with a directed answer and selected curated topic sections for the search query from the generative AI model. For instance, in example implementations, act 640 involves receiving a generative text document that includes a directed answer followed by one or more curated topic sections based on providing the first curated topic section and a second curated topic section with a generative document prompt to the generative AI model. In various implementations, act 640 includes receiving a generative text document that includes a directed answer followed by one or more multiple curated topic sections from the generative AI model based on providing the generative AI model with a generative document prompt that includes the search query, the ranked list of intents, multiple curated topic sections, and a directed answer instruction. In some implementations, the generative text document is an unformatted generative text document that includes directed answer text followed by one or more curated topic section texts.

In one or more implementations, act 640 includes aggregating multiple curated topic sections received from the generative AI model into a combined topic section document and deduplicating content within the combined topic section document based on the linked citations. In some instances, deduplicating content within the combined topic section document based on the linked citations includes identifying a first text instance that cites a first linked citation and a second text instance that cites the first linked citation, determining a first rank associated with the first text instance and a second rank associated with the second text instance, and removing the second text instance based on the second rank being lower than the first rank.

In some implementations, in act 640, the generative document prompt includes the combined topic section document, the search query, a first topic query, a search intent sentence for the search query, and instructions for the generative AI model to generate the directed answer that directly addresses the search query and/or generate the one or more curated topic sections from the combined topic section document. In some cases, generating the one or more curated topic sections from the combined topic section document includes determining that the first curated topic section and the second curated topic section include overlapping content and/or excluding the second curated topic section from the generative text document based on determining that the second curated topic section is ranked lower than the first curated topic section.

In various implementations, in act 640, the generative AI model organizes the one or more curated topic sections in the generative text document based on the order of topic sections in the search intent sentence. In some implementations, act 640 includes generating a set of answer cards that correspond to content within the generative text document.

In some cases, the generative AI model refers to a first generative AI model that receives the search intent prompt, a second generative AI model that receives the topic section generative AI model, and a third generative AI model that receives the generative document prompt. In some instances, the first generative AI model, the second generative AI model, and/or the third generative AI model are different generative AI models. In some instances, these are all the same generative AI model or different instances of the same generative AI model.

Figure 7:
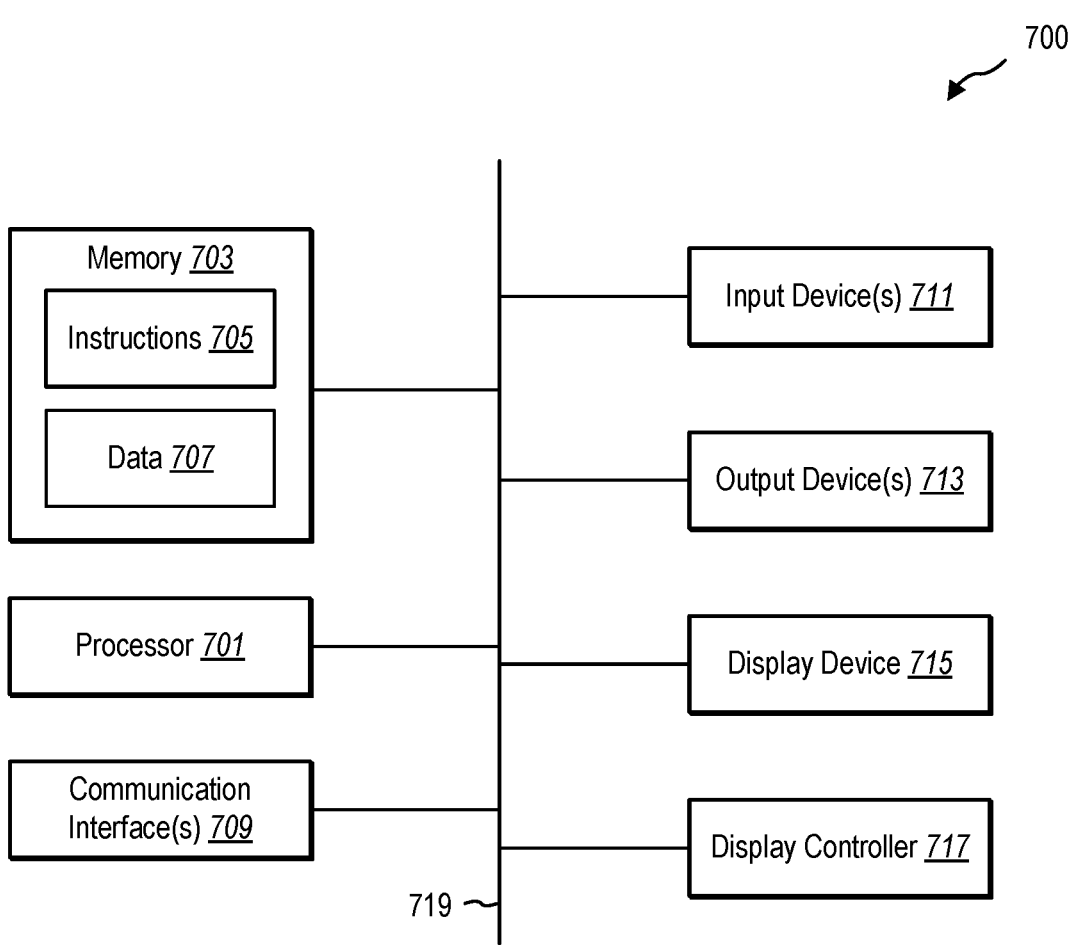
FIG. 7 illustrates example components included within a computer system used to implement the generative document system.

FIG. 7 illustrates certain components that may be included within a computer system 700. The computer system 700 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single-or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU) and may cause computer-implemented instructions to be performed. Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface (s) 709 include a Universal Serial Bus (USB), an Ethernet adapter, a wireless adapter that operates according to an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer. Combinations of the above are also included within the scope of computer-readable media.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for generating one or more search result documents using one or more artificial intelligence (AI) models, comprising:
obtaining a set of search result links from a search grounding system corresponding to a search query received from a client device;
based on providing a search intent prompt and the set of search result links to a generative AI model, receiving a set of topic sections from the generative AI model based on the set of search result links;
for a first topic section of the set of topic sections:
obtaining a set of first topic section links from the search grounding system; and
based on providing a first topic section prompt that includes the first topic section and the set of first topic section links to the generative AI model, receiving a first curated topic section with text and linked citations; and
based on providing the first curated topic section and a second curated topic section with a generative document prompt to the generative AI model, receiving a generative text document that includes a directed answer followed by one or more curated topic sections.

2. The computer-implemented method of claim 1, wherein the search intent prompt includes instructions for the generative AI model to:
determine a ranked list of intents for the search query based on the set of search result links;
determine the set of topic sections from the ranked list of intents; and
generate a search intent sentence that includes topic sections in the set of topic sections according to a topic section rank.

3. The computer-implemented method of claim 2, wherein:
the search intent prompt further includes instructions for the generative AI model to generate the set of topic sections as a list; and
each topic section in the list includes a topic title and a topic query.

4. The computer-implemented method of claim 3, wherein each topic section in the list also includes a set of alternative topic queries.

5. The computer-implemented method of claim 1, further comprising:
obtaining multiple sets of topic section links for multiple topic sections from the search grounding system concurrently; and
providing multiple topic section prompts for the multiple topic sections to one or more generative AI models concurrently.

6. The computer-implemented method of claim 1, wherein the first topic section prompt includes a first topic title, filtered content for the first topic section, the search query, a first topic query, and a search intent sentence for the search query.

7. The computer-implemented method of claim 1, further comprising:
aggregating multiple curated topic sections received from the generative AI model into a combined topic section document; and
deduplicating content within the combined topic section document based on the linked citations.

8. The computer-implemented method of claim 7, wherein the generative document prompt includes the combined topic section document, the search query, a first topic query, a search intent sentence for the search query, and instructions for the generative AI model to:
generate the directed answer that directly addresses the search query; and
generate the one or more curated topic sections from the combined topic section document.

9. The computer-implemented method of claim 8, wherein the generative AI model organizes the one or more curated topic sections in the generative text document based on an order of topic sections in the search intent sentence.

10. The computer-implemented method of claim 1, wherein the generative text document is an unformatted generative text document that includes directed answer text followed by one or more curated topic section texts.

11. The computer-implemented method of claim 1, further comprising generating a set of answer cards that corresponds to content within the generative text document.

12. A system comprising:

a processing system; and a computer memory comprising instructions that, when executed by the processing system, cause the system to perform operations of:

obtaining a set of search result links from a search grounding system corresponding to a search query received from a client device;

based on providing a search intent prompt and the set of search result links to a first generative AI model, receiving a set of topic sections from the first generative AI model based on the set of search result links;

for a first topic section of the set of topic sections:

obtaining a set of first topic section links from the search grounding system; and based on providing a first topic section prompt that includes the first topic section and the set of first topic section links to a second generative AI model, receiving a first curated topic section with text and linked citations; and based on providing the first curated topic section and a second curated topic section with a generative document prompt to a third generative AI model, receiving a generative text document that includes a directed answer followed by one or more curated topic sections.

13. The system of claim 12, wherein the first generative AI model, the second generative AI model, and the third generative AI model are different generative AI models.

14. The system of claim 12, wherein the operations further comprise, for the first topic section, providing the search query and a first topic query to the search grounding system to obtain a set of first topic section content that includes a set of topic section links, a set of linked content, and a set of answers each corresponding to the first topic section.

15. The system of claim 14, wherein the operations further comprise, for the first topic section, filtering the set of first topic section content based on a data limit threshold associated with the third generative AI model.

16. The system of claim 15, wherein the operations further comprise providing an alternative first topic query to the search grounding system with the search query and the first topic query, wherein:

the set of first topic section content is separated into ranked lists according to the search query, the first topic query, and the alternative first topic query; and filtering the set of first topic section content includes:

selecting a highest-ranked content from each of the ranked lists; and continuing to select a next highest-ranked content from each of the ranked lists until the data limit threshold is satisfied.

17. A computer-implemented method for generating one or more search result documents using one or more artificial intelligence (AI) models, comprising:

obtaining a set of search result links from a search grounding system corresponding to a search query received from a client device;

based on providing a search intent prompt that includes the search query, the set of search result links, and query intent instructions to a generative AI model, receiving a set of topic sections from the generative AI model determined from a ranked list of intents corresponding to the search query and the set of search result links, wherein each topic section in the set of topic sections includes a topic title and a topic query;

for each topic section in the set of topic sections:

receiving a set of topic section links and corresponding content in response to providing the search query and the topic query to the search grounding system; and receiving a curated topic section with text having linked citations from the generative AI model based on providing a topic section prompt that includes the topic title, the set of topic section links, and the corresponding content to the generative AI model; and receiving a generative text document that includes a directed answer followed by one or more multiple curated topic sections from the generative AI model based on providing the generative AI model with a generative document prompt that includes the search query, the ranked list of intents, multiple curated topic sections, and a directed answer instruction.

18. The computer-implemented method of claim 17, wherein the search intent prompt does not include user information.

19. The computer-implemented method of claim 17, wherein the search intent prompt includes instructions for the generative AI model to:

determine a ranked list of intents for the search query based on the set of search result links;

determine the set of topic sections from the ranked list of intents; and generate a search intent sentence that includes topic sections in the set of topic sections according to a topic section rank.

20. The computer-implemented method of claim 17, wherein the generative text document is an unformatted generative text document that includes directed answer text followed by one or more curated topic section texts.

\* \* \* \* \*